(12) United States Patent
Hathuc et al.

(10) Patent No.: US 9,247,767 B2
(45) Date of Patent: Feb. 2, 2016

(54) METHOD OF MANUFACTURING PROTEIN BEVERAGES AND DENATURIZING LOOP APPARATUS AND SYSTEM

(71) Applicants: PepsiCo, Inc., Purchase, NY (US); TETRA LAVAL HOLDINGS & FINANCE S.A., Pully (CH)

(72) Inventors: Hoang Hathuc, Bradenton, FL (US); Arnab Sarkar, Arlington Heights, IL (US); Rei-Young Amos Wu, Palatine, IL (US); Bozena Malmgren, Pully (CH)

(73) Assignees: PepsiCo, Inc., Purchase, NY (US); Tetra Laval Holdings & Finance, S.A., Pully (CH)

( * ) Notice: Subject to any disclaimer, the term of this patent is extended or adjusted under 35 U.S.C. 154(b) by 0 days.

(21) Appl. No.: 13/782,606

(22) Filed: Mar. 1, 2013

(65) Prior Publication Data

US 2013/0230629 A1 Sep. 5, 2013

Related U.S. Application Data

(60) Provisional application No. 61/606,066, filed on Mar. 2, 2012.

(51) Int. Cl.
*A23L 2/70* (2006.01)
*A23L 2/46* (2006.01)
(Continued)

(52) U.S. Cl.
CPC .... *A23L 2/70* (2013.01); *A23J 3/00* (2013.01); *A23L 2/46* (2013.01); *A23L 2/66* (2013.01); *A23L 3/18* (2013.01)

(58) Field of Classification Search
CPC .............. A23J 3/00; A23L 2/46; A23L 2/66; A23L 2/70; A23L 3/18
USPC ......... 426/519, 520, 580, 522, 590, 599, 656, 426/657, 521
See application file for complete search history.

(56) References Cited

U.S. PATENT DOCUMENTS

| 3,290,153 A | 12/1966 | Bayne |
| 4,494,451 A * | 1/1985 | Hickey .............................. 99/276 |

(Continued)

FOREIGN PATENT DOCUMENTS

| WO | 2006058538 | 6/2006 |
| WO | 2008032039 | 3/2008 |

(Continued)

OTHER PUBLICATIONS

Belmar-Beiny, M. T.; Toyoda, I.; Fryer, P. J., "The initial stages of fouling from milk proteins and minerals onto surfaces above 100C. Dept. of Chemical Engineering, Cambridge, UK. Proceedings of Fouling Mitigation of Industrial Heat-Exchange Equipment", an International Conference, San Luis Obispo, Calif.,Jun. 18-23, 1995 (1997), Meeting Date 1995, 601-612. Publisher: Begell House, New York, N.Y.

(Continued)

*Primary Examiner* — Preston Smith
(74) *Attorney, Agent, or Firm* — James R. Gourley; Colin P. Cahoon; Carstens & Cahoon, LLP

(57) ABSTRACT

A method and system for forming a beverage mixture comprising protein is disclosed. The method comprises heating the beverage in a heat exchanger, transferring the beverage to a hold loop located outside of the heat exchanger, and denaturizing the protein within the hold loop for a residence time, after the beverage is heated in the heat exchanger such that the denaturizing occurs outside of the heat exchanger to prevent fouling of the heat exchanger. The system comprises a beverage forming tank, a heat exchanger for heating the beverage, and a first hold loop separate from the heat exchanger, which is configured to hold the beverage for a residence time to denaturize a protein in the beverage.

21 Claims, 2 Drawing Sheets

(51) Int. Cl.
   *A23L 2/66* (2006.01)
   *A23L 3/18* (2006.01)
   *A23J 3/00* (2006.01)

(56) References Cited

U.S. PATENT DOCUMENTS

| | | | |
|---|---|---|---|
| 4,571,338 A | | 2/1986 | Okonogi |
| 5,494,696 A | * | 2/1996 | Holst et al. .................... 426/583 |
| 5,879,561 A | * | 3/1999 | Klomp et al. ................. 210/698 |
| 6,495,194 B2 | | 12/2002 | Sato |
| 6,511,695 B1 | | 1/2003 | Paquin |
| 6,605,311 B2 | | 8/2003 | Villagran |
| 6,874,356 B2 | | 4/2005 | Kornfeldt |
| 7,811,620 B2 | | 10/2010 | Merrill |
| 2002/0197369 A1 | | 12/2002 | Modler |
| 2003/0136555 A1 | * | 7/2003 | Dinh ............................. 165/274 |
| 2003/0175394 A1 | * | 9/2003 | Modler ......................... 426/522 |
| 2004/0161514 A1 | * | 8/2004 | Akashe et al. ................ 426/422 |
| 2005/0196510 A1 | | 9/2005 | Walters |
| 2006/0151533 A1 | | 7/2006 | Simunovic |
| 2006/0240159 A1 | | 10/2006 | Cash |
| 2007/0148305 A1 | | 6/2007 | Sherwood |
| 2007/0148307 A1 | | 6/2007 | Sherwood |
| 2008/0038424 A1 | | 2/2008 | Krusemann |
| 2008/0098900 A1 | | 5/2008 | Aremu |
| 2008/0105282 A1 | | 5/2008 | Fernholz |
| 2008/0160149 A1 | | 7/2008 | Nasrallan |
| 2008/0305235 A1 | | 12/2008 | Gao |
| 2009/0280229 A1 | | 11/2009 | Constantine |
| 2009/0311378 A1 | | 12/2009 | Wilaschin |
| 2009/0317514 A1 | | 12/2009 | Sizer |
| 2010/0047423 A1 | | 2/2010 | Kruesemann |
| 2010/0075006 A1 | | 3/2010 | Semenza |
| 2010/0136203 A1 | | 6/2010 | Sakata |
| 2010/0143567 A1 | | 6/2010 | Ya et al. |
| 2011/0003975 A1 | | 1/2011 | Arase |
| 2011/0005739 A1 | | 1/2011 | Finney |
| 2011/0097442 A1 | | 4/2011 | Harju |

FOREIGN PATENT DOCUMENTS

| | | |
|---|---|---|
| WO | 2010106296 | 9/2010 |
| WO | 2010120199 | 10/2010 |

OTHER PUBLICATIONS

Delplace, F.; Leuliet, J. C.; Bott, T. R., "Influence of plate geometry on fouling of plate heat exchangers by whey proteins." Proceedings of "Fouling Mitigation of Industrial Heat-Exchange Equipment", an International Conference, San Luis Obispo, Calif., Jun. 18-23, 1995 (1997), Meeting Date 1995, 565-576. Publisher: Begell House, New York, N.Y.

Davies, T. J.; Henstridge, S. C.; Gillham, C. R.; Wilson, D. I. "Investigation of whey protein deposit properties using heat flux sensors." Department of Chemical Engineering, University of Cambridge, Cambridge, UK. Food and Bioproducts Processing (1997), 75(C2), 106-110. Publisher:Institution of Chemical Engineers.

Fryer, P. J.; Robbins, P. T.; Green, C.; Schreier, P. J. R.; Pritchard, A. M.; Hasting, A. P. M.; Royston, D. G.; Richardson, J. F. "A statistical model for fouling of a plate heat exchanger by whey protein solution at UHT conditions." School of Chemical Engineering, University of Birmingham, UK. Food and Bioproducts Processing (1996), 74(C4), 189-199. Publisher: Institution of Chemical Engineers.

Gillham, C. R.; Fryer, P. J.; Hasting, A. P. M.; Wilson, D. I. "Cleaning-in-place of whey protein fouling deposits: mechanisms controlling cleaning." Department of Chemical Engineering, University of Cambridge, Cambridge, UK. Food and Bioproducts Processing (1999), 77(C2), 127-136. Publisher: Institution of Chemical Engineers, CODEN: FBPREO ISSN: 0960-3085.

The Chemistry of Milk, Dairy Processing Handbook, 2003, p. 17-42, Chapter 2, Tetra Pak Processing Systems AB, Lund, Sweden.

Jan. 28, 2015—(AU) Office Action—App 2013225818—Eng Tran.

* cited by examiner

METHOD OF MANUFACTURING PROTEIN BEVERAGES AND DENATURIZING LOOP APPARATUS AND SYSTEM

This application claims priority to U.S. Provisional Patent Application No. 61/606,066, filed Mar. 2, 2012, and entitled "Method of Manufacturing Protein Beverages and Denaturizing Loop Apparatus and System" which is incorporated herein by reference in its entirety

FIELD

This disclosure generally relates to a method and apparatus for integrating a protein denaturizing step for efficient production of beverages with high dairy-protein content, for example, fruit juice smoothies whose pH is in the protein iso-electric range that tend to cause protein flocculation and low acid thermal process requirements in a refrigerated and/or an ambient distribution.

BACKGROUND

Various types of beverages or products are stored in different types of containers for the eventual consumption by consumers. Beverages and other products are typically filled in containers such as thermoplastic or glass liquid containers in an automated filling process. The product must be sterilized, or free from live microorganisms of food and spoilage concern (including spores thereof) to provide the consumer with a safe product that has the respective quality attributes expected by the consumer.

Typically containers can be filled with beverages in a "cold-fill" process, "ambient fill" process, or a "hot-fill" process. In cold-fill applications, the beverage product is heated to an elevated temperature for a specific time interval to kill any live microorganisms of food safety and spoilage concern, (including spores thereof) (also referred to as pasteurization) and is then cooled to generally ambient temperatures. In ambient-fill applications, the beverage product is also heated to an elevated temperature for a specific time interval to kill any live microorganisms and spores (also referred to as pasteurization) and is then cooled to a generally ambient temperature or 70-100° F. In both cases, pre-sterilized containers are then filled with the cooled sterilized product in a filler, and the containers are capped and prepared for shipping.

A cold-fill or an ambient technique can be used in filling operations for fruit juice smoothie beverages. During this process, it may be desirable to denaturize proteins in protein fruit smoothie beverages for taste, texture, and other reasons. Many systems are designed to denaturalize proteins on the heating surfaces of heat exchangers. However, in the case of higher protein beverages, for example, formulations of 3-8% whey protein, during the filling operation, protein may foul the heat exchanger during denaturation, which may lead to product flavor deterioration because of the buildup of denatured protein in the flow pathway, and may slow the filling process. Specifically, during the denaturation process, proteins become less soluble, and the proteins tend to form sediments in the heat exchanger tubes, which results in a fouled heat exchanger and product flavor deterioration.

BRIEF SUMMARY

In an exemplary embodiment, a method comprising forming a beverage mixture comprising protein is disclosed. The method comprises heating the beverage in a heat exchanger, transferring the beverage to a hold loop located outside of the heat exchanger, and denaturizing the protein within the hold loop for a residence time, after the beverage is heated in the heat exchanger, such that the denaturizing occurs outside of the heat exchanger to prevent fouling of the heat exchanger.

In another exemplary embodiment, a system for processing a beverage is disclosed. The system comprises a beverage forming tank, a heat exchanger for heating the beverage, and a first hold loop separate from the heat exchanger, which is configured to hold the beverage for a residence time to denaturize a protein in the beverage.

In another exemplary embodiment, a method for forming a beverage mixture comprising whey protein is disclosed. The method comprises heating the beverage, transferring the heated beverage to a hold loop, and denaturizing the protein within the hold loop for a residence time after the beverage is heated.

It will be appreciated by those skilled in the art, given the benefit of the following description of certain exemplary embodiments of the methods and systems disclosed herein, that at least certain embodiments disclosed herein have improved or alternative configurations suitable to provide enhanced benefits. These and other aspects, features and advantages of this disclosure or of certain embodiments of the disclosure will be further understood by those skilled in the art from the following description of exemplary embodiments taken in conjunction with the following drawings.

BRIEF DESCRIPTION OF THE DRAWINGS

To understand the present disclosure, it will now be described by way of example, with reference to the accompanying drawings in which.

DETAILED DESCRIPTION OF CERTAIN EXEMPLARY EMBODIMENTS

Figure 1:
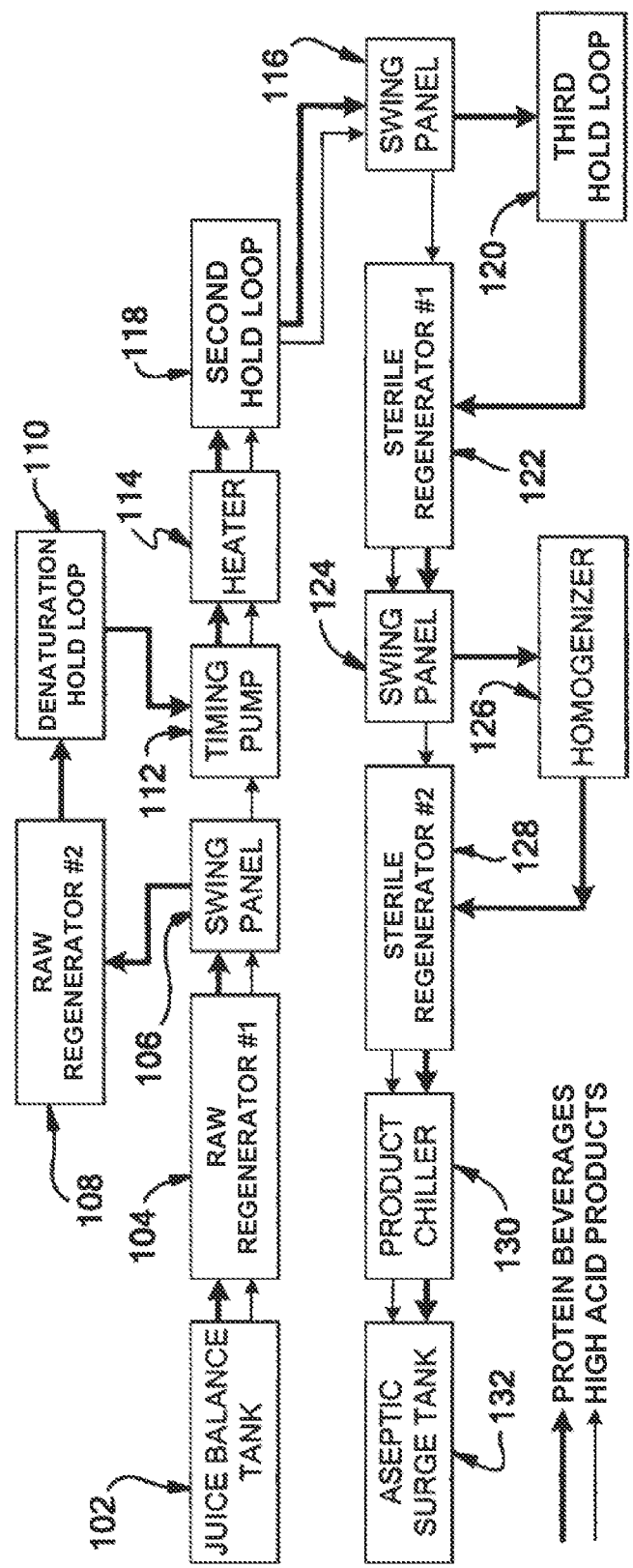
FIG. 1 shows a schematic of a flow diagram for an exemplary process for preparing beverages.

While this disclosure is susceptible of embodiments in many different forms, there are shown in the drawings and will herein be described in detail exemplary embodiments with the understanding that the present disclosure is to be considered as an exemplification of the principles of the invention and is not intended to limit the broad aspect of the invention to the embodiments illustrated.

In an exemplary embodiment, the beverage processing system comprises a juice balance tank 102 for mixing the components of the beverage. A first raw regenerator 104, a second raw regenerator 108, a heater 114, a first sterile regenerator 122, and a second sterile regenerator 128 (all of which can be heat exchangers or other heating devices) are used for heating the beverage being processed. Swing panels which comprise removable pipes (described in further detail below) can be implemented for bypassing certain components of the system or routing the beverage depending on the type of beverage being processed. In one embodiment a first swing panel 106, a second swing panel 116, and a third swing panel 124 can be used. A first hold loop or denaturation hold loop 110 is used for denaturizing the protein in the beverage. In one embodiment, the denaturation piping loop comprises a ½" to 20" diameter stainless steel pipe. A timing pump 112 can be used for releasing the beverage from the denaturation hold loop 110. A second hold loop 118 and a third hold loop 120 can be implemented for maintaining the product at a certain temperature for sterilization purposes, which can also be in the form of a loop or pipe. A homogenizer 126 can be used for mixing and smoothing out the beverage. A product chiller 130 can be used for cooling the beverage after the beverage is processed, and an aseptic surge tank 132 can also be implemented for storing the beverage prior to filling.

Figure 2:
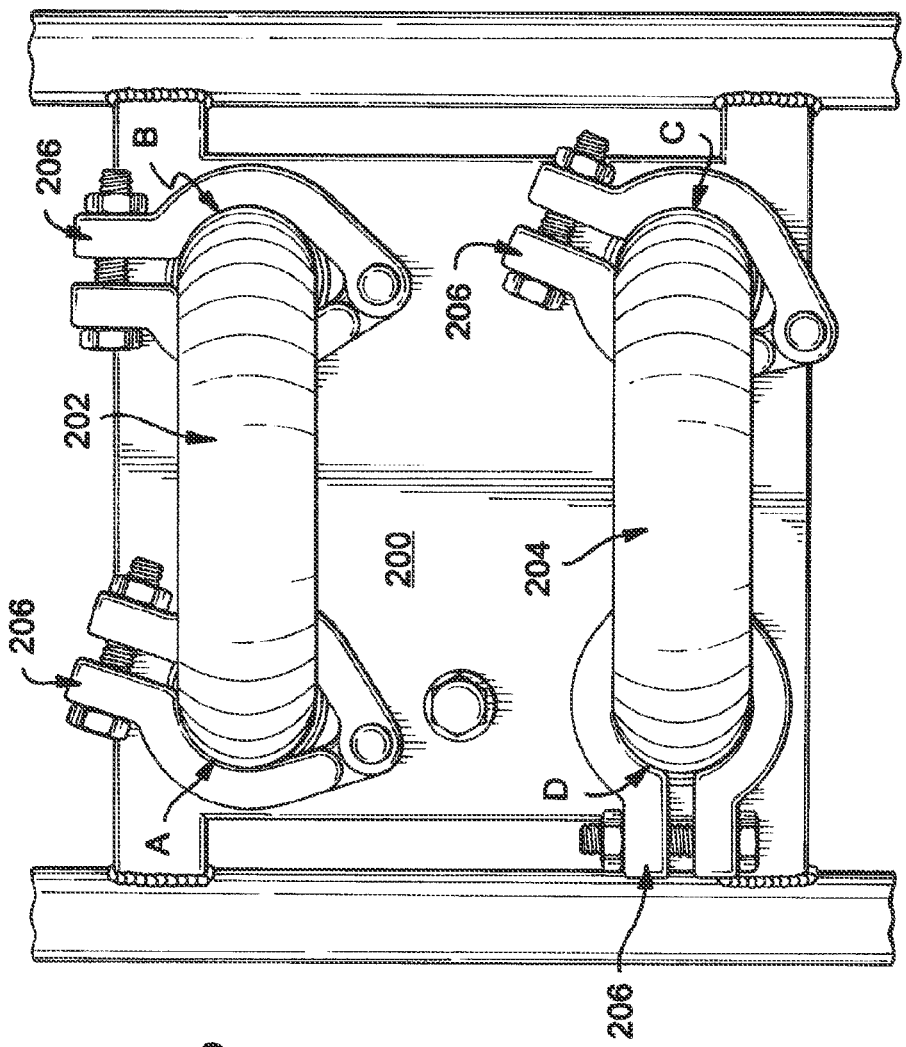
FIG. 2 depicts an exemplary embodiment of a swing panel that can be used in conjunction with the exemplary process depicted in FIG. 1.

An exemplary swing panel 200 is depicted in FIG. 2, which can be implemented for any of the first swing panel 106, the second swing panel 116, and the third swing panel 124. Removable elbow joints or pipes 202, 204 are provided on the swing panel 202 to provide for a bypass. There are generally four ports (A, B, C, D) on the swing panel. Fluid flows from port A to port B through pipe 202 and then passes through one or more of the second raw regenerator 108, denaturation hold loop 110, third hold loop 120, and the homogenizer 126, etc. and then through port C through the pipe 204 and then into port D. When it is desired to bypass certain components of the system, such as the heater, hold loop or homogenizer, etc., the pipe 202 can simply be removed from the top set of ports A and B and the bottom pipe 204 can be removed from the ports C and D. The pipe 202 can then be connected to port A and port D such that the fluid bypasses one or more of the second raw regenerator 108, denaturation hold loop 110, third hold loop 120, and the homogenizer 126, etc. The pipes 202, 204 can be provided with removable clamps 206 to provide for the ability to easily remove the pipes 202, 204 to provide for the bypass. With this arrangement, the system can be configured to bypass certain components of the system, such as the second raw regenerator 108, denaturation hold loop 110, third hold loop 120, and the homogenizer 126, based on the type of beverage being processed.

An exemplary method of producing a high protein beverage or protein containing beverages will now be described in relation to the schematic in FIG. 1. The high protein beverage follows the pathway of the darker arrows in the schematic. In this embodiment, protein in the beverage is denatured inside of the first hold tube or denaturation hold loop 110 where no heating is applied.

In this process, the beverage contents comprising the desired raw components that will form the ultimate beverage are initially mixed in the juice balance tank 102. The first raw regenerator 104 heats up the beverage contents after the mixture leaves the juice balance tank 102. Next, the beverage enters the first swing panel 106 which routes the beverage into the second raw regenerator 108 for additional heating and to the denaturation hold loop 110 for denaturation. The beverage is heated by the second raw regenerator 108, which in one embodiment the second raw regenerator 108 can heat the beverage in the range of 180° F. to 210° F. Then, the beverage leaves the raw regenerator 108 and is held in the denaturation hold loop 110. In one exemplary embodiment, the residence time in the denaturation hold loop 110 is in the range of 30 to 180 seconds. This allows for the desired denaturation of the protein in the beverage.

After the desired residence time, the timing pump 112 transfers the beverage to a heater 114 for additional heating. In one exemplary embodiment, the beverage is heated in the heater 114. The beverage is then routed to the second hold loop 118. The beverage then enters the second swing panel 116 and is routed into the third hold loop 120. The second hold loop 118 and the third hold loop 120 provide for additional sterilization of the beverage by holding the beverage at a temperature for a certain time period necessary for sterilization. Also, the position of the second hold loop 118 and the third hold loop 120 can be rearranged such that the beverage enters the third hold loop 120 prior to the second hold loop 118. The high protein beverage is then passed to the first sterile regenerator 122, where it is heated further to kill any bacteria. The purpose of the heater 144, second hold loop 118, and the third hold loop 120 is to deliver a thermal process that has an equivalent lethality of twice or greater than that of the reference thermal death of the most heat resistant microorganism of concern in the particular product.

The beverage then enters the third swing panel 124 which routes the high protein beverage to a homogenizer 126, which mixes the high protein beverage further to make the beverage product more consistent and generally smoother. The homogenizer 126 comprises a narrow opening (not shown), which the beverage is forced through for mixing the beverage. The beverage is heated again in the second sterile regenerator 128 to kill any remaining bacteria. The beverage then goes through the chiller 130 and then it is routed to the aseptic surge tank 132. Finally, the beverage is routed to a filler (not shown) for a filling operation.

A similar manufacturing process could be followed with respect to a high acid beverage product without protein. Generally speaking, these types of beverage products do not require denaturation and additional mixing. The pathway of the high acid product is illustrated by the lighter arrows. The high acid product generally follows the same pathway as the high protein beverage product. However, the high acid product does not enter the second raw regenerator 108, the first hold loop (denaturation loop 110), the third hold loop 120, or the homogenizer 126 because the product does not contain protein that needs to be denaturized or that needs to be mixed further by the homogenizer.

Certain steps of the manufacturing process need not be performed in the order described and shown. In other words, the various components of the system can be rearranged in certain instances to achieve the desired properties of the product.

It is contemplated that the methods described herein can be used with any one of dairy protein, plant based protein or any combinations thereof. In particular, the methods described herein can be used with whey protein or soy protein and combinations thereof.

The methods described herein can increase the rate of production as in previous systems. For example, implementing the separate denaturation hold loop 110 for denaturation can significantly extend the production time for processing beverages with high protein content between the Aseptically Injected Caustic (AIC) cleaning procedures, where the thermal process system including the heat exchangers are cleaned after a certain time period of production. A productivity increase of more than 40% using the methods described herein was observed because the denaturation hold loop 110 greatly reduces the build-up rate of protein material on heat exchangers. The downtime for AIC procedures to remove protein buildup on heat exchanger surfaces typically ranges around 40 minutes. The methods described herein significantly reduced the number of AIC procedures needed during a typical production run. Additionally, previous systems run at slower flow rates to avoid accelerated heat exchanger protein fouling as a result of rapid heating. Whereas the system described herein runs at a 40% faster rate.

Moreover, when implementing the methods described herein, the system resulted in a more consistent product quality. Furthermore, implementing the denaturation loop as a separate loop to the system provides manufacturing flexibility, since the loop can be by-passed for manufacturing of non-dairy beverage products such as high acid products or fruit juices.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A method of denaturizing proteins in a liquid beverage comprising:
    mixing beverage contents comprising one or more proteins, each protein having an isoelectric point, and juice to form the liquid beverage having a pH at an isoelectric point or between isoelectric points of the one or more proteins in the liquid beverage;
    heating the liquid beverage in a heat exchanger;
    transferring the liquid beverage to a first hold loop located outside of the heat exchanger;
    denaturizing the proteins within the first hold loop for a residence time after the liquid beverage is heated in the heat exchanger such that the denaturizing occurs outside of the heat exchanger to prevent fouling of the heat exchanger; and
    transferring the liquid beverage to a second hold loop and sterilizing the liquid beverage in the second hold loop.

2. The method of claim 1 wherein the first hold loop is a stainless steel pipe.

3. The method of claim 1 wherein the residence time in the first hold loop is within a range of 30 to 180 seconds.

4. The method of claim 1 wherein the liquid beverage is heated in the heat exchanger within a range of 180° F. to 210° F. prior to transferring the liquid beverage to the first hold loop.

5. The method of claim 1 wherein the liquid beverage comprises a fruit juice smoothie comprising 3% to 8% whey protein.

6. The method of claim 1 wherein the first hold loop is configured to be bypassed during processing of other liquid beverages.

7. The method of claim 1 wherein a swing panel comprising a removable pipe is configured to route the liquid beverage to the heat exchanger and to the first hold loop.

8. The method of claim 1 wherein no additional heating is applied to the liquid beverage in the first hold loop.

9. The method of claim 1 wherein the liquid beverage is passed through a third hold loop.

10. The method of claim 1 wherein the liquid beverage is passed through a homogenizer.

11. A method for denaturizing protein in a liquid beverage mixture comprising:
    forming the liquid beverage mixture comprising a protein having an isoelectric point and juice, the liquid beverage mixture having a pH at the isoelectric point of the protein;
    heating the liquid beverage mixture;
    after heating the liquid beverage mixture transferring the liquid beverage mixture to a first hold loop;
    denaturizing the protein within the first hold loop for a residence time after the liquid beverage mixture is heated; and
    transferring the liquid beverage to a second hold loop and sterilizing the liquid beverage in the second hold loop.

12. The method of claim 11 wherein the first hold loop is a stainless steel pipe.

13. The method of claim 11 wherein the residence time in the first hold loop is within a range of 30 to 180 seconds.

14. The method of claim 11 wherein the liquid beverage mixture is heated within a range of 180° F. to 210° F. prior to transferring the liquid beverage mixture to the first hold loop.

15. The method of claim 11 wherein the liquid beverage mixture comprises a fruit juice smoothie comprising 3% to 8% whey protein.

16. The method of claim 11 wherein a swing panel comprising a removable pipe routes the liquid beverage mixture to the first hold loop.

17. The method of claim 11 wherein no additional heating is applied to the liquid beverage mixture in the first hold loop.

18. The method of claim 11 wherein the liquid beverage mixture is passed through a third hold loop.

19. The method of claim 11 wherein the liquid beverage mixture is passed through a homogenizer.

20. The method of claim 11 wherein the protein is formed from one of dairy, plants, and combinations thereof.

21. The method of claim 11 further comprising forming the liquid beverage mixture with more than one protein.

* * * * *